United States Patent
Hatada et al.

(10) Patent No.: US 11,169,656 B2
(45) Date of Patent: Nov. 9, 2021

(54) USER INTERFACE METHOD, INFORMATION PROCESSING SYSTEM, AND USER INTERFACE PROGRAM MEDIUM

(71) Applicant: FUJITSU LIMITED, Kawasaki (JP)

(72) Inventors: Koki Hatada, Kawasaki (JP); Naoki Nishiguchi, Kawasaki (JP); Takashi Ohno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 343 days.

(21) Appl. No.: 15/799,452

(22) Filed: Oct. 31, 2017

(65) Prior Publication Data
US 2018/0136818 A1 May 17, 2018

(30) Foreign Application Priority Data
Nov. 17, 2016 (JP) .............................. JP2016-224098

(51) Int. Cl.
| | |
|---|---|
| *G06F 3/0486* | (2013.01) |
| *G06F 3/0484* | (2013.01) |
| *G06F 3/0481* | (2013.01) |
| *G06F 3/0482* | (2013.01) |
| *G06F 3/0488* | (2013.01) |
| *G06F 3/14* | (2006.01) |

(52) U.S. Cl.
CPC ........ *G06F 3/04817* (2013.01); *G06F 3/0486* (2013.01); *G06F 3/04842* (2013.01); *G06F 3/0482* (2013.01); *G06F 3/0484* (2013.01); *G06F 3/04883* (2013.01); *G06F 3/04886* (2013.01); *G06F 3/1423* (2013.01); *G06F 2203/04803* (2013.01)

(58) Field of Classification Search
CPC .. G06F 3/0486; G06F 3/0484; G06F 3/04842; G06F 3/0481; G06F 3/04817; G06F 3/0482
See application file for complete search history.

(56) References Cited

U.S. PATENT DOCUMENTS

| | | | |
|---|---|---|---|
| 5,745,111 A * | 4/1998 | Cline | G06F 3/0481 |
| | | | 715/769 |
| 2002/0059288 A1* | 5/2002 | Yagi | G06F 3/0481 |

(Continued)

FOREIGN PATENT DOCUMENTS

| | | |
|---|---|---|
| JP | 2008-216499 | 9/2008 |
| JP | 2011-134001 | 7/2011 |

(Continued)

OTHER PUBLICATIONS

Japanese Office Action dated Apr. 7, 2020 from Japanese Patent Application No. 2016-224098, 5 pages.

*Primary Examiner* — Ting Z Lee
(74) *Attorney, Agent, or Firm* — Staas & Halsey, LLP

(57) ABSTRACT

A user interface method, performed by a computer, including: identifying a window that exists in an area determined in accordance with a relative distance between a starting point and an operating point of an input operation to move an object and a direction from the starting point to the operating point, in an operation to select a window as a movement destination of the object from among a plurality of windows displayed on a plurality of displays; and displaying a movement destination candidate icon indicating the identified window.

9 Claims, 17 Drawing Sheets

(56) References Cited

U.S. PATENT DOCUMENTS

| | | | | |
|---|---|---|---|---|
| 2003/0160825 A1* | 8/2003 | Weber | .................... | G06F 3/0486 |
| | | | | 715/769 |
| 2004/0150664 A1* | 8/2004 | Baudisch | .............. | G06F 3/0486 |
| | | | | 715/740 |
| 2010/0122194 A1* | 5/2010 | Rogers | ................ | G06F 3/04817 |
| | | | | 715/769 |
| 2011/0116769 A1* | 5/2011 | Sugiyama | ............. | G06F 3/0481 |
| | | | | 386/282 |
| 2011/0154248 A1 | 6/2011 | Tsuruoka | | |
| 2011/0260997 A1 | 10/2011 | Ozaki | | |
| 2014/0068477 A1* | 3/2014 | Roh | ....................... | G06F 3/0486 |
| | | | | 715/765 |
| 2014/0101587 A1* | 4/2014 | Sekine | ................... | G06F 3/0488 |
| | | | | 715/769 |
| 2015/0185975 A1* | 7/2015 | Hasegawa | ............. | G06F 3/0482 |
| | | | | 715/765 |

FOREIGN PATENT DOCUMENTS

| | | |
|---|---|---|
| JP | 2011-227821 | 11/2011 |
| JP | 2014-75044 | 4/2014 |

* cited by examiner

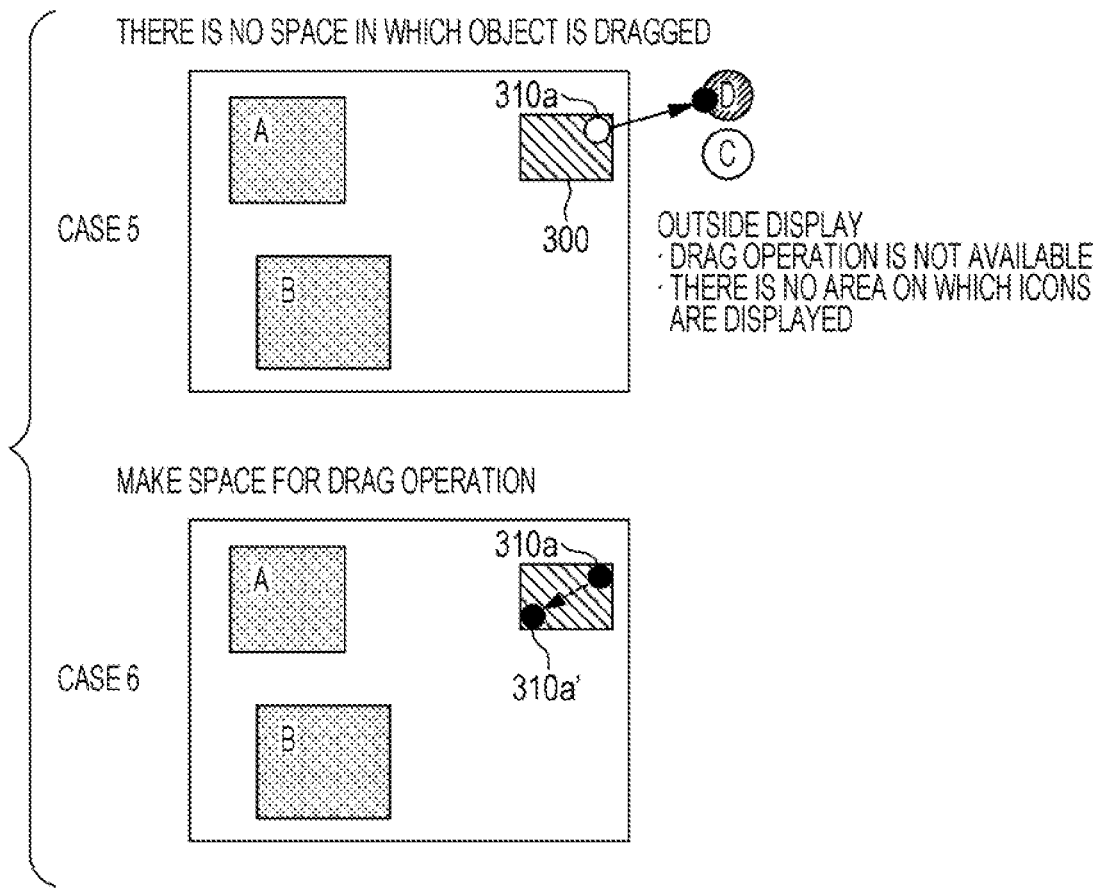

USER INTERFACE METHOD, INFORMATION PROCESSING SYSTEM, AND USER INTERFACE PROGRAM MEDIUM

CROSS-REFERENCE TO RELATED APPLICATION

This application is based upon and claims the benefit of priority of the prior Japanese Patent Application No. 2016-224098, filed on Nov. 17, 2016, the entire contents of which are incorporated herein by reference.

FIELD

The embodiments discussed herein are related to a user interface.

BACKGROUND

Recently, due to popularization of mobile communication terminals, and development of a cloud technology and a communication technology, it has become easier to bring materials that had been created at the office desk to a meeting place, enlarge and display the materials through a projector or the like, and edit the materials by a touch panel operation of a large screen terminal.

FIG. 1 is a diagram illustrating an example of a user interface using a space. A user interface is known in which a plurality of display devices is linked to each other to cause a plurality of display screens to be used as a single large screen. FIG. 1 illustrates an example of a case in which a space (wall and table) is used as a display screen.

A wall screen 110 is a display screen projected on the wall through a projector. On the wall screen 110, for example, windows 111a and 111b of an application (application called a worksheet in FIG. 1) are displayed. A table screen 120 is a display screen projected on the table through the projector. In the table screen 120, a user may take a memo using a pen dedicated to a digital sticky note (hereinafter referred to as a card) on the table screen 120.

It is assumed that the wall screen 110 and the table screen 120 are linked to each other so as to be used as a single display screen, and the right edge of the wall screen 110 and the top edge of the table screen 120 are coupled (linked) to each other. Therefore, when the user drags (selects) and slides (performs a movement operation on) a card in which a memo has been taken on the table screen 120, the card is moved onto the wall screen 110 through the top of the table screen 120 and the right edge of the wall screen 110, as illustrated by an arrow a. The card is moved in accordance with an inertia of the slide operation by the user. Here, the card that has been slid by the operation of the user is stored, for example, in a window with which the card has been overlapped for the first time. In this case, the card that has been slid as illustrated by the arrow a is stored in the window 111b. In addition, as illustrated by an arrow b, the window 111b is a window with which a card has been overlapped for the first time, so that it is difficult to transmit the card to the window 111a across the window 111b.

Here, each application may share data with a computer or the like. Therefore, the user may browse the memo that has been described in the card stored in the window 111b through a computer into which the application has been installed.

A technology is known by which the workload of screen selection is reduced by specifying a screen on which a window is to be displayed from a plurality of screens and displaying the window on the specified screen (for example, see Japanese Laid-open Patent Publication No. 2011-134001).

A technology is known by which a drag operation of a selected object across a first display and a second display is supported so that the object is displayed on the second display when the object is moved to the end part of the first display, which faces a boundary between the first display and the second display (for example, see Japanese Laid-open Patent Publication No. 2011-227821.

A system is known that realizes exchange pieces of display information between a plurality of screens based on an operation of an object (for example, see Japanese Laid-open Patent Publication No. 2008-216499).

A method is known in which an icon corresponding to a movement destination window is selected and an object on a display screen is stored in the movement destination window when the object is to be moved onto the movement destination window. Here, when there is a lot of windows each of which is a movement destination candidate to which the object is to be moved, it is troublesome for the user to select an icon corresponding to the movement destination window, from among a lot of icons respectively corresponding to the plurality of windows that are the movement destination candidates.

An object of embodiments of the technology discussed herein is to easily select a window.

SUMMARY

According to an aspect of the invention, an user interface method, performed by a computer, including: identifying a window that exists in an area determined in accordance with a relative distance between a starting point and an operating point of an input operation to move an object and a direction from the starting point to the operating point, in an operation to select a window as a movement destination of the object from among a plurality of windows displayed on a plurality of displays; and displaying a movement destination candidate icon indicating the identified window.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of processing when a card exists at the edge of a screen;

FIG. 11 is a diagram illustrating an example of a drag direction;

DESCRIPTION OF EMBODIMENTS

An information processing device according to embodiments of the technology discussed herein displays icons corresponding to windows that are movement destination candidates, based on a distance and a direction between a starting point and an operating point of an input operation of a user when a window in a plurality of displays is selected as a movement destination of an object. Therefore, it is only sufficient that the user selects a window from the few icons, so that the operability of the information processing device is improved.

Figure 1:
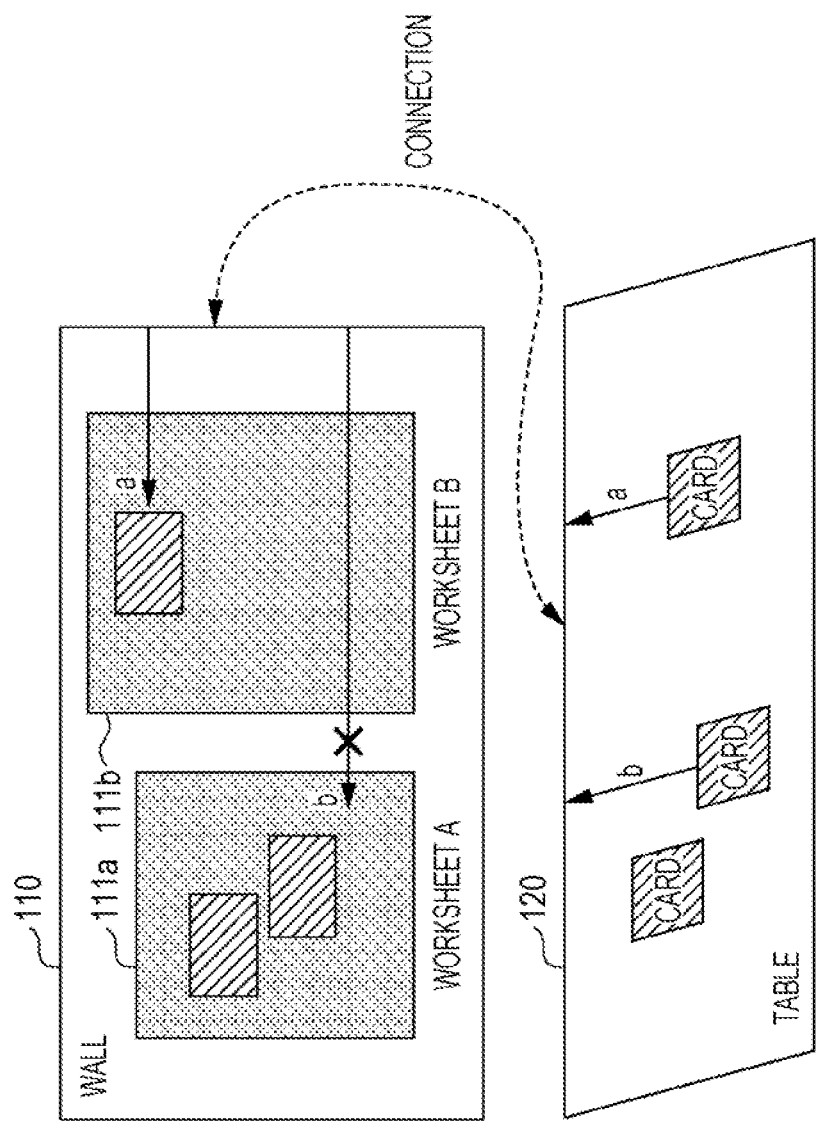
FIG. 1 is a diagram illustrating an example of a user interface using a space.
Figure 2:
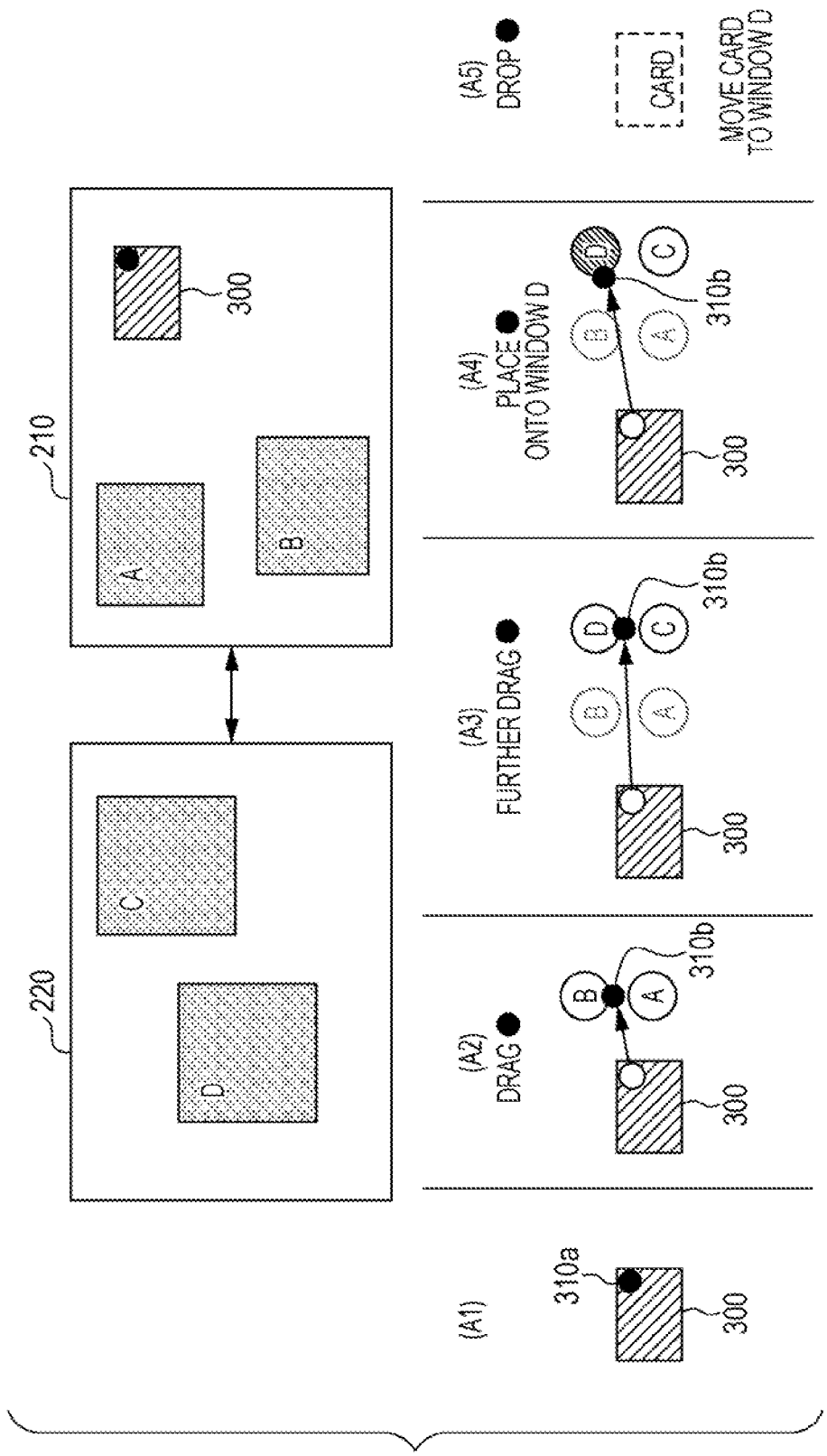
FIG. 2 is a diagram illustrating an example of a selection method of a movement destination window in a first embodiment.

The embodiments of the technology discussed herein are described in detail below with reference to drawings. FIG. 2 is a diagram illustrating an example of a selection method of a movement destination window in a first embodiment. An information processing device according to the first embodiment is provided so that the left edge of a screen 210 and the right edge of a screen 220 are coupled to each other and are used as a single screen. In the information processing device, windows A and B are arranged in the screen 210, and a card 300 is also arranged in the screen 210. In addition, in the information processing device, windows C and D are arranged in the screen 220. In the following description, the card 300 is also referred to as an object.

Here, an operation procedure when the user performs input of an operation in which the card 300 is moved onto the window D and processing of the information processing device are described. The movement of the card 300 is performed by "drag operation". In the drag operation, for example, the card is dragged in a direction opposed to a direction in which the card is to be slid while leaving the card 300 to be selected (in the drag state). For example, this is the same as an action in which a rubber or a string on which an object is hung is drawn such as a bow or a slingshot. The card 300 is moved (slid) when the drag state is released after the drag operation. The drag operation of the user may be performed using a mouse operation through a computer, an operation through a touch panel, a dedicated device that reads a location on a screen that has been projected through a projector, or the like.

In (A1), when the information processing device obtains operation information on an input operation in which the card 300 is selected, the information processing device determines the card 300 to be in a drag state. Here, a circle 310a indicates a location pressed when the user has selected the card 300. In the following description, the circle 310a is referred to as "starting point" of the drag operation.

In (A2), the information processing device obtains operation information on a drag operation in which the card 300 is moved by the user. Here, a circle 310b indicates a location that is being pressed by the user during the movement operation. In the following description, a point that is being dragged such as the circle 310b is referred to as "operating point". For example, the operating point corresponds to the current location of a cursor when the cursor is operated through a mouse or the like, and corresponds to the current location that is being touched by a finger when a touch panel is operated by the finger. Therefore, the information processing device identifies a window that exists in an area determined in accordance with a relative distance between the starting point and the operating point and a direction from the starting point to the operating point. In the processing of (A2), the distance between the starting point and the operating point is small, so that a window is searched for that is arranged in an area that is on the opposite side of the operating point across the starting point and that is in the vicinity of the starting point, and windows A and B are identified. Therefore, the information processing device displays icons A and B respectively corresponding to the identified windows A and B. The icons A and B are displayed on an area that is in the vicinity of the operating point and that is on the opposite side of the windows A and B across the starting point. In FIG. 2, the icons A and B are respectively represented by "A" and "B" enclosed by circles.

In (A3), the information processing device obtains operation information on a drag operation in which the card 300 is further moved by the user as compared with (A2). The information processing device identifies a window that exists in an area determined in accordance with a relative distance between the starting point and the operating point and a direction from the starting point to the operating point. In the processing of (A3), the distance between the starting point and the operating point is large, so that a window is searched for that is arranged in an area that is on the opposite side of the operating point across the starting point and that is far from the starting point as compared with (A2), and windows C and D are identified. Therefore, the information processing device displays icons C and D respectively corresponding to the identified windows C and D. When the icons C and D are displayed, the icons A and B that have been displayed in (A2) may not be displayed or may be displayed with pale colored lines indicating that the icons A and B are not allowed to be selected.

In (A4), the information processing device obtains operation information indicating that the operating point is moved onto the icon D corresponding to the window D to which the user desires to move the card 300. In (A4), the operating point is in a state of being overlapped with the icon D in the display screen.

In (A5), the information processing device obtains operation information indicating that the user drops the operating point onto the icon D, and the drag state is released. Therefore, the information processing device stores the card 300 in an application of the window D corresponding to the icon D.

As described above, in the selection method of a movement destination window in the first embodiment, even when there is a plurality of movement destination candidates, not all icons are displayed at once and limited display of icons for the movement destination candidates is performed depending on a degree of dragging. Therefore, it is only sufficient that the user selects a window that is a movement destination from a few icons.

Figure 3:
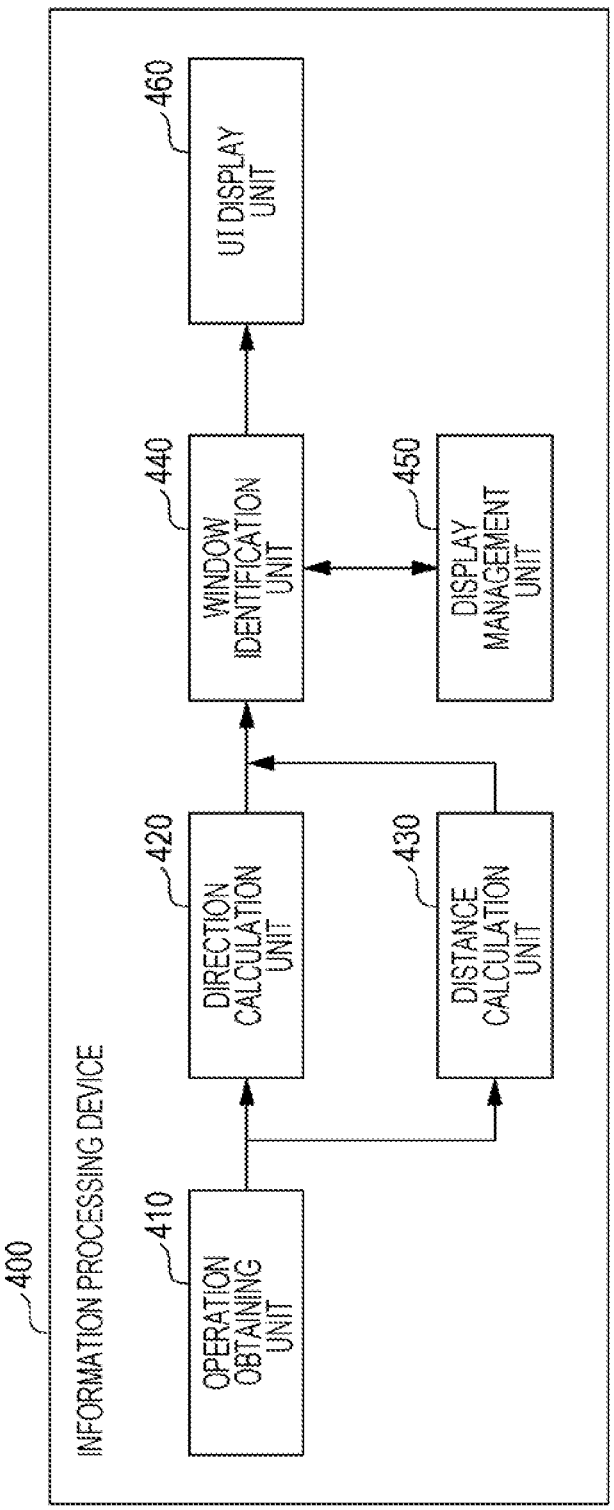
FIG. 3 is a diagram illustrating an example of a configuration of an information processing device according to the first embodiment.

FIG. 3 is a diagram illustrating an example of a configuration of an information processing device according to the first embodiment. An information processing device 400 includes an operation obtaining unit 410, a direction calculation unit 420, a distance calculation unit 430, a window identification unit 440, a display management unit 450, and a user interface (UI) display unit 460.

The operation obtaining unit 410 obtains information on an operation in which an object is moved by the user, which is input to the information processing device 400. The operation obtaining unit 410 executes obtaining processing of the pieces of operation information in (A1) to (A5). The user inputs an operation of the object using a mouse operation through a computer, an operation through a touch panel, a dedicated device that reads a location on a screen that has been projected through a projector, or the like.

The direction calculation unit 420 calculates a direction of an operating point for a starting point. The distance calculation unit 430 calculates a relative distance between the starting point and the operating point. The direction calculation unit 420 and the distance calculation unit 430 respectively execute the direction calculation processing in (A2) and the distance calculation processing in (A3).

The window identification unit 440 identifies a window that exists in an area determined in accordance with the distance and the direction that have been calculated in the distance calculation unit 430 and the direction calculation unit 420. In addition, the window identification unit 440 executes processing in which the card 300 is stored in the identified window.

In the example illustrated in FIG. 2, in the information processing device, the left edge of the screen 210 and the right edge of the screen 220 are coupled to each other so as to be used as a single screen. The display management unit 450 manages a relationship such as a connection relationship between the plurality of displays.

The UI display unit 460 displays windows, a starting point, an operating point, icons, and the like, on the display screen.

Figure 4:
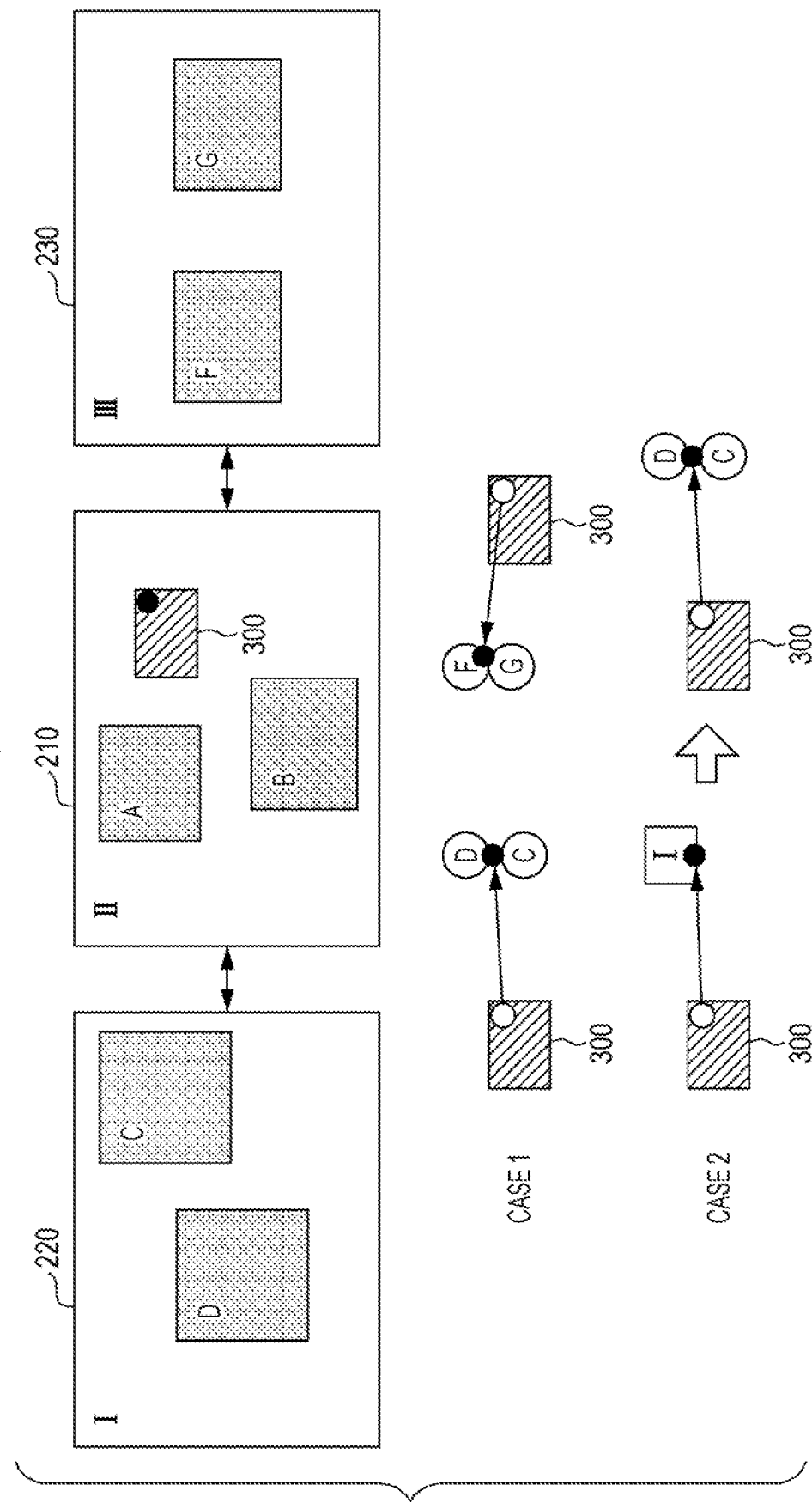
FIG. 4 is a diagram illustrating another example of the selection method of the movement destination window in the first embodiment.

FIG. 4 is a diagram illustrating another example of the selection method of a movement destination window in the first embodiment. In FIG. 4, an example is illustrated in which the left edge of a screen 230 is further coupled to the right edge of the screen 210 in addition to the screens 210 and 220 of FIG. 2. In the information processing device 400, windows F and G are arranged in the screen 230.

A case 1 includes a case in which the window C or D is set as a movement destination, and a case in which the window F or G is set as a movement destination. The window C or D exists on the left side viewed from the card 300. Therefore, when the window C or D is selected as a window that is a movement destination, the user may select an icon corresponding to the window C or D by moving the operating point in the right direction from the starting point. In addition, the window F or G exists on the right side viewed from the card 300. Therefore, when the window F or G is selected as a window that is a movement destination, the user may select an icon corresponding to the window F or G by moving the operating point in the left direction from the starting point.

A case 2 indicates an example in which a display is selected before a window is selected. When there is a plurality of displays as illustrated in FIG. 4, the information processing device 400 displays a display number used to identify a display that is a movement destination candidate so that the display number is allowed to be selected when the operating point is moved. In the example of FIG. 4, as a display number, "I" is assigned to the screen 220, "II" is assigned to the screen 210, and "III" is assigned to the screen 230. When a display that is a movement destination candidate is selected, the information processing device 400 displays icons respectively corresponding to windows that are movement destination candidates, which have been arranged in the selected display. As described above, the user may easily select a movement destination window from among the windows that are the movement destination candidates when the information processing device 400 performs display so that a display and a window are respectively allowed to be selected in two stages when the movement destination window is selected.

Figure 5:
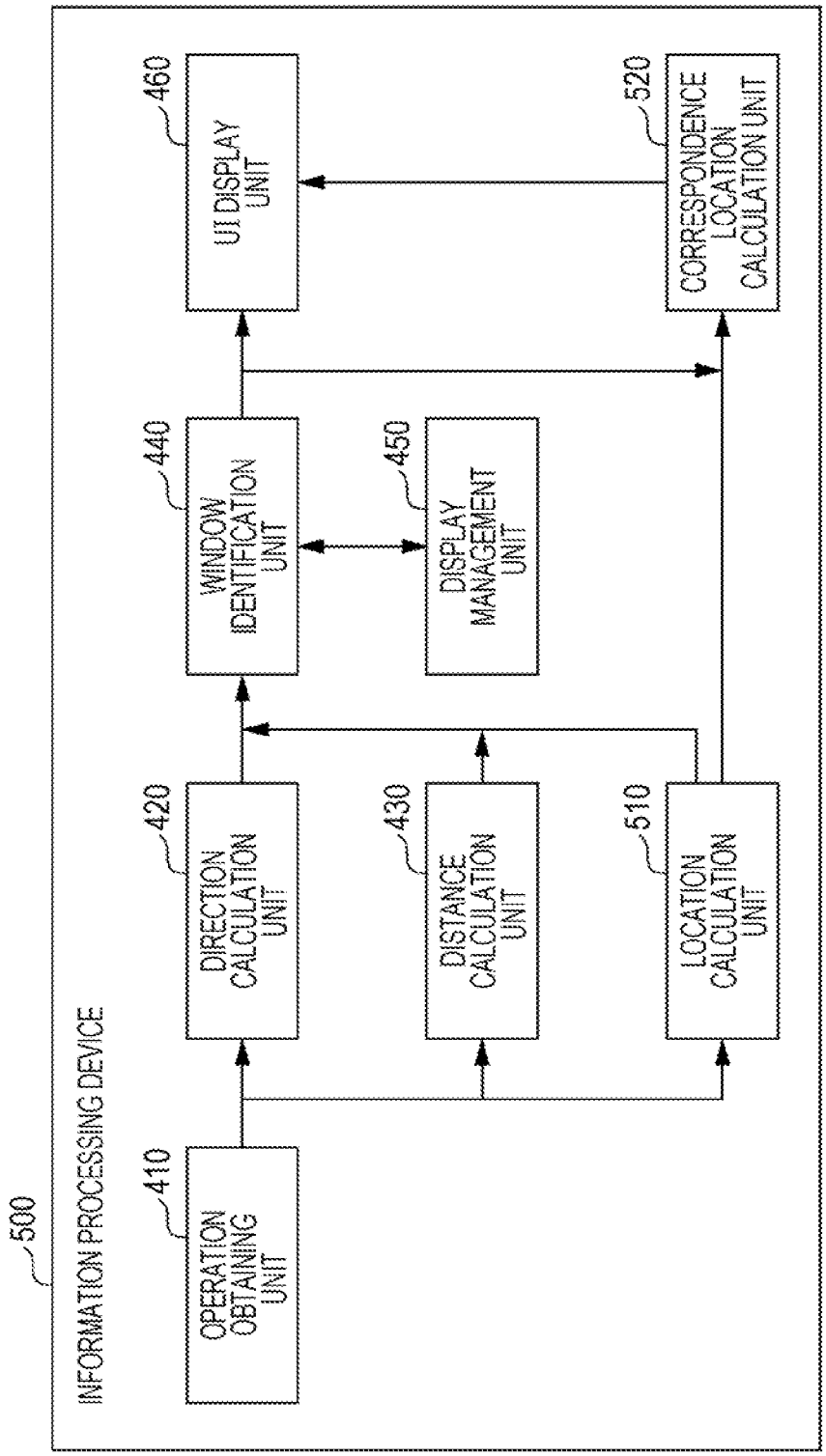
FIG. 5 is a diagram illustrating an example of a configuration of an information processing device according to a second embodiment.

FIG. 5 is a diagram illustrating an example of a configuration of an information processing device according to a second embodiment. In an information processing device 500 according to the second embodiment, the same number is assigned to a configuration similar to the information processing device 400 according to the first embodiment. The information processing device 500 includes a location calculation unit 510 and a correspondence location calculation unit 520 in addition to the units of the information processing device 400.

In the information processing device 400 according to the first embodiment, a window is allowed to be selected as a movement destination of the card 300. In the information processing device 500 according to the second embodiment, a location in a window and a location outside the window is specified and the card 300 is moved to the specified location.

The location calculation unit 510 calculates a location of the operating point on an icon or a location of the operating point around the icon. The correspondence location calculation unit 520 calculates a location in the window or around the window, which corresponds to the location of the operating point on the icon or around the icon, which has been calculated by the location calculation unit 510. The detail of the movement method of the object is described with reference to FIG. 6.

Figure 6:
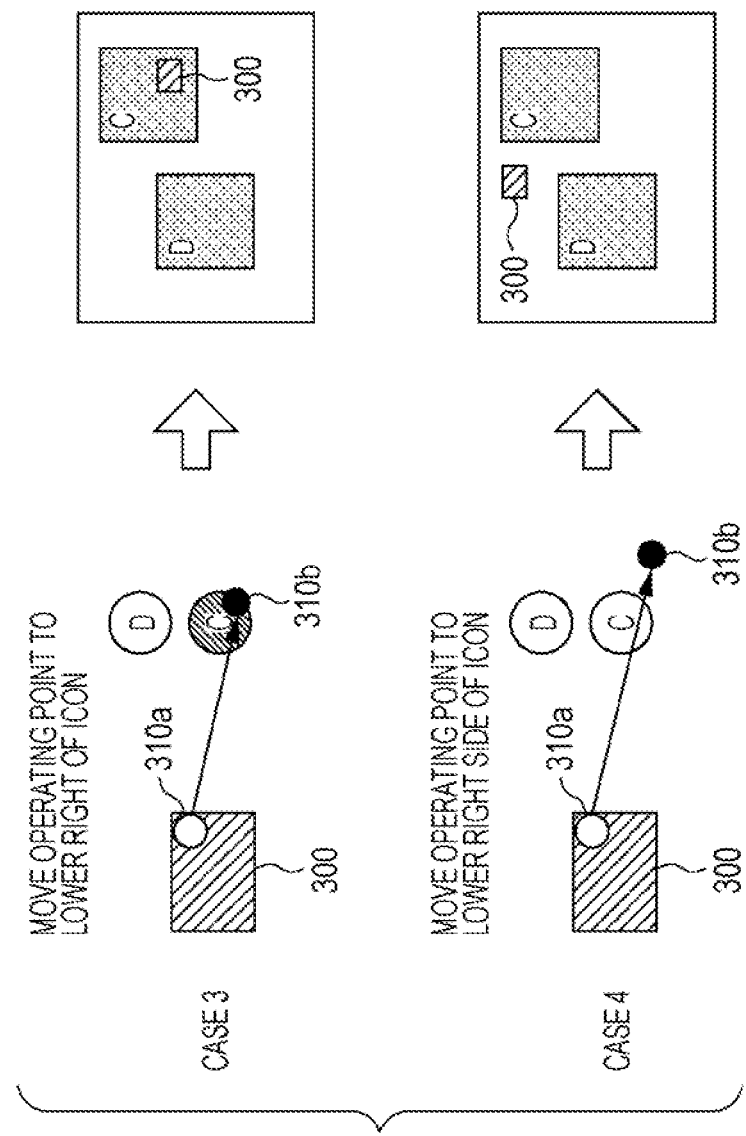
FIG. 6 is a diagram illustrating an example of a movement method of an object using the information processing device according to the second embodiment.

FIG. 6 is a diagram illustrating an example of the movement method of the object using the information processing device according to the second embodiment. A case 3 illustrated in FIG. 6 indicates an example in which the user places the operating point at the lower right of an icon C. In the case 3, the operation obtaining unit 410 obtains operation information indicating that the user has moved the operating point to the lower right of the icon C. After that, the location calculation unit 510 calculates a specific location of the operating point (location on the icon or location around the icon). Here, the location calculation unit 510 determines the operating point to have been arranged at the lower right of the icon C. Therefore, the correspondence location calculation unit 520 calculates a location of a window with which the location at the lower right of the icon C, which has been calculated by the location calculation unit 510, is replaced. Therefore, the correspondence location calculation unit 520 determines that the location at the lower right of the icon C corresponds to the location at the lower right of the window C. As a result, the card 300 is stored at the lower right of the window C.

A case 4 illustrated in FIG. 6 indicates an example in which the user places the operating point at the outer lower right side of the icon C. In the case 4, the operation obtaining unit 410 obtains operation information indicating that the user has moved the operating point to the outer lower right side of the icon C. After that, the location calculation unit 510 calculates a specific location of the operating point (location on the icon or location around the icon). Here, the location calculation unit 510 determines the operating point to have been arranged on the outer lower right side of the icon C. As a result, the correspondence location calculation unit 520 calculates a location of a window, with which the location at the outer lower right side of the icon C, which has been calculated by the location calculation unit 510, is replaced. Therefore, the correspondence location calculation unit 520 determines that the location at the outer lower right side of the icon C corresponds to the location at the outer upper left side of the window C. As a result, the card 300 is moved to the outer upper left side of the window C.

Figure 7:
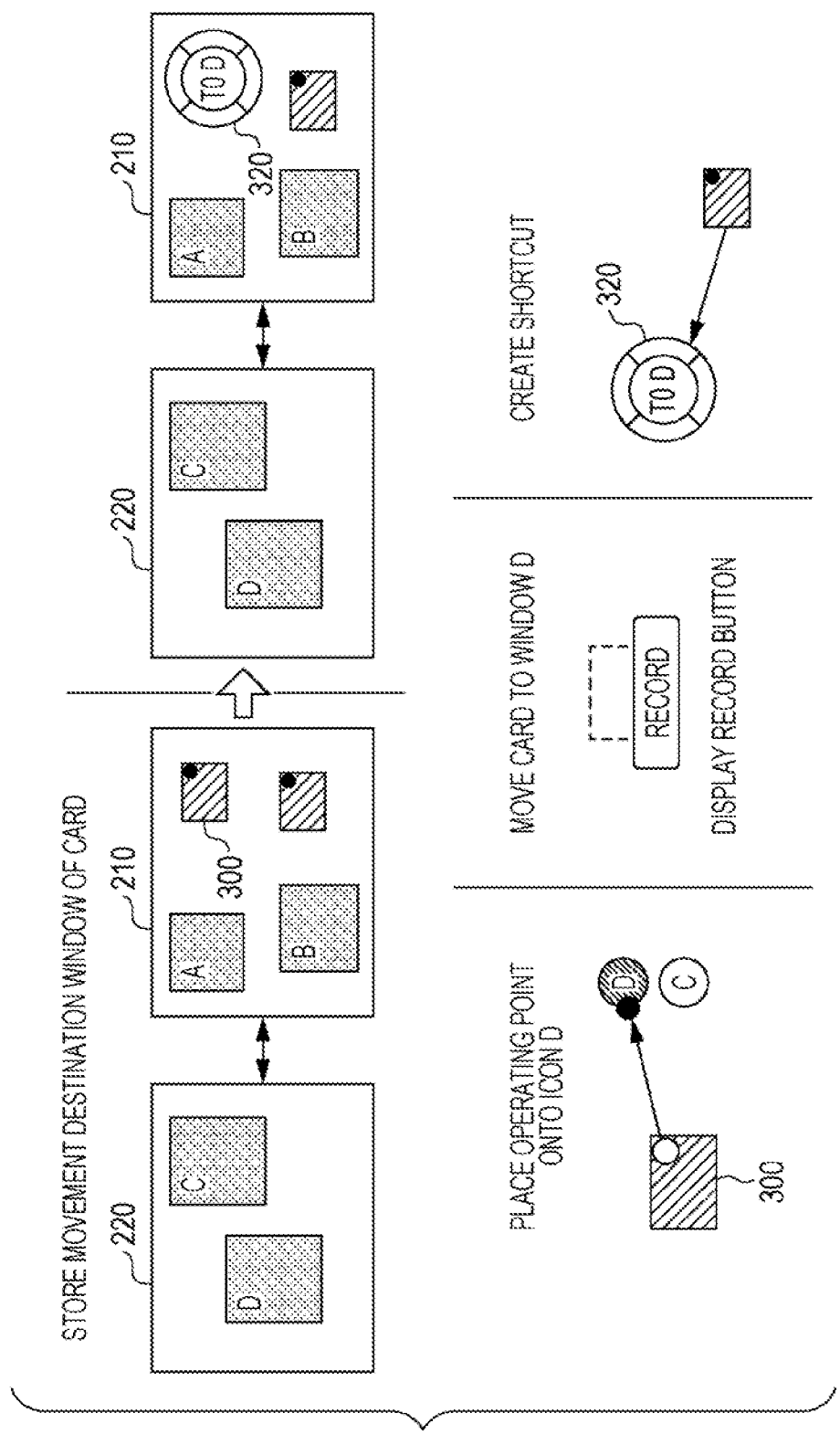
FIG. 7 is a diagram illustrating an example of processing in which a movement destination of an object is stored as a shortcut.

FIG. 7 is a diagram illustrating an example of processing in which the movement destination of the object is stored as a shortcut. It is assumed that screens 210 and 220 in FIG. 7 are similar to the screens 210 and 220 in FIG. 2. Here, it is assumed that the user stores the card 300 in the window D.

The operation obtaining unit 410 obtains an operation in which a drag state has been released after the operating point of the card 300 had been placed onto the icon D. As a result, the window identification unit 440 identifies a window D as a window corresponding to the icon D and causes the card 300 to be stored in the window D.

In the example of the processing in FIG. 7, after the card 300 has been stored in the window D, the UI display unit 460 displays a "record" button at the location at which the card 300 has existed before being stored in the window D. The "record" button is a button used to inquire to the user about whether a storage destination for storage in the window is recorded. Here, it is assumed that the operation obtaining unit 410 obtains an operation in which the record button has been pressed. The window identification unit 440 identifies the window that is the destination in which the card 300 has been stored (here, the window D) when the record button has been displayed. The UI display unit 460 displays a shortcut frame 320 to the window. Therefore, the user may store a card on the screen 210 in the window D by an operation in which the card is moved onto the shortcut frame 320.

As described above, a movement destination of the card 300 may also be selected by creating a shortcut in addition to the icons.

Figure 8:
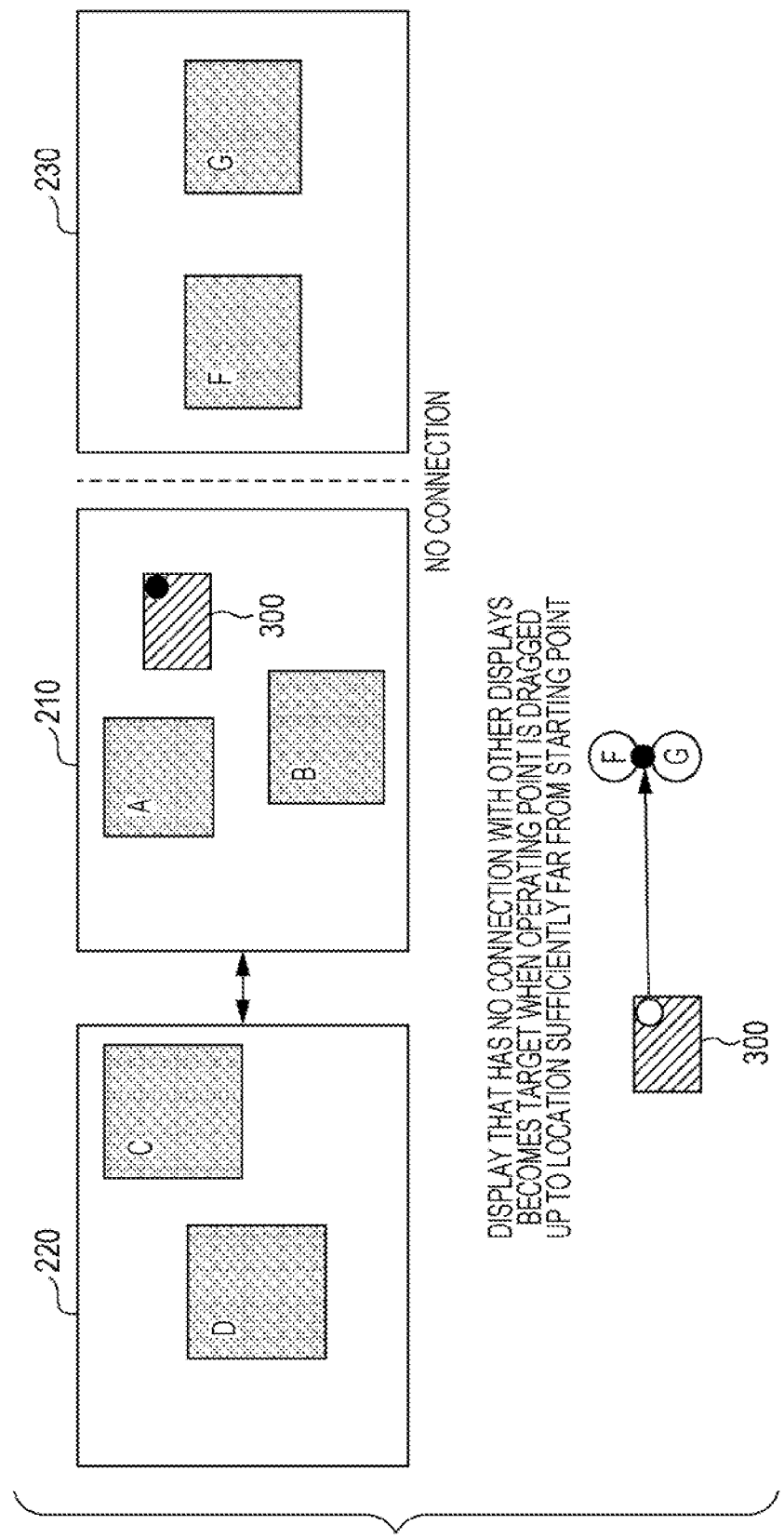
FIG. 8 is a diagram illustrating a movement example to a screen that is not coupled to the other screens.

FIG. 8 is a diagram illustrating a movement example to a screen that is not coupled to the other screens. The system of FIG. 8 includes the screen 210, the screen 220, and the screen 230, and the screens are respectively similar to the screens in FIG. 4. The left edge of the screen 210 and the right edge of the screen 220 are coupled to each other. In the system example of FIG. 8, differently from the example of FIG. 4, the right edge of the screen 210 and the left edge of the screen 230 are not coupled to each other. However, it is assumed that each of the screens 210 to 230 is in a connection relationship (management target) with the information processing device 400 or the information processing device 500.

As described above, when the card 300 is to be moved onto the screen 230 that is not coupled to the screens 210 and 220 (the screens 210 and 220, and the screen 230 are not used as a single screen), the user may also move the card 300 to the window F or D in the screen 230 that is not coupled to the screens 210 and 220 by performing an operation in which the operating point of the card 300 is dragged up to a location sufficiently far from the starting point. Whether the operating point has been dragged up to a location sufficiently far from the starting point is performed by the window identification unit 440. In addition, as the screen 230 is not coupled to the screen 210 and 220, there is no definition of a direction of the drag operation toward the window F or G. Therefore, in the operation in which the operating point is dragged up to the location sufficiently far from the starting point, a direction of the drag operation may not be especially limited.

Figure 9:
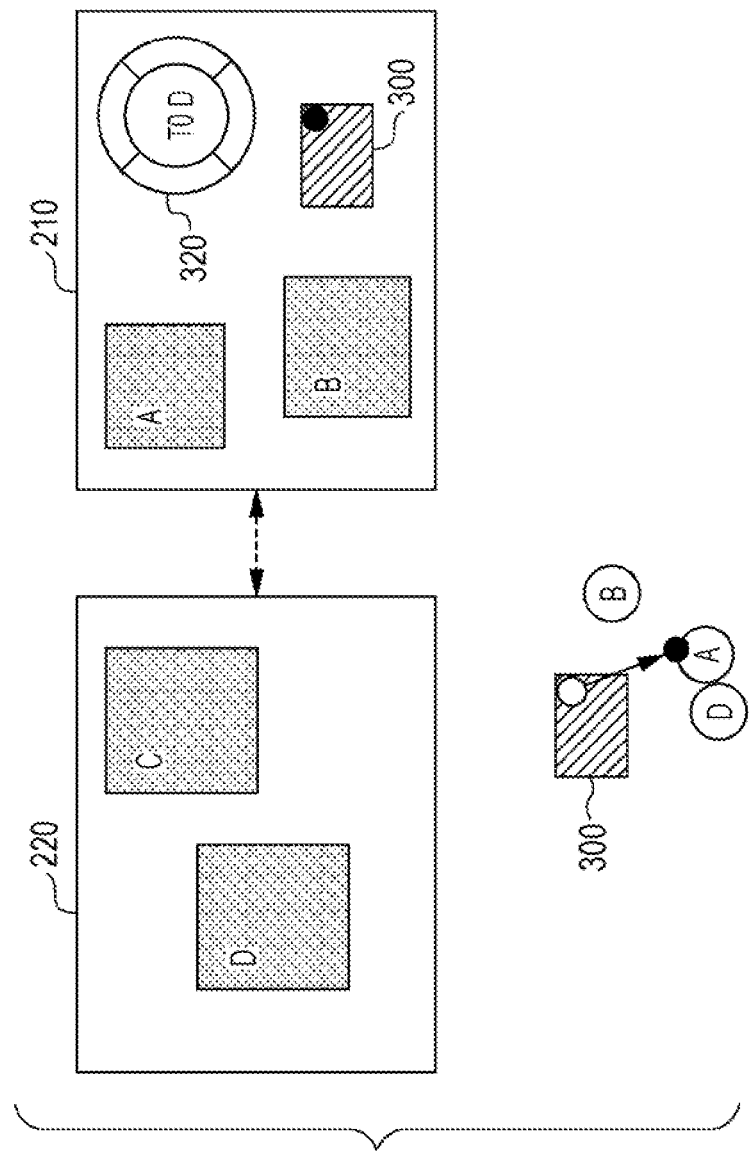
FIG. 9 is a diagram illustrating an example of a storage method in a shortcut.

FIG. 9 is a diagram illustrating an example of a storage method in a shortcut. The screen 220 and the screen 210 in FIG. 9 are respectively similar to the screen 220 and the screen 210 in FIG. 7 after the shortcut to the window D has been created.

Here, when an operation is performed in which the card 300 is moved, the UI display unit 460 may display an icon D (D enclosed by a circle in FIG. 9) in addition to the shortcut frame 320 to the window D. For example, when the operation has been performed in which the card 300 is dragged, the UI display unit 460 displays the icon A, the icon B, and the icon D respectively corresponding to the window A, the window B, and the shortcut frame (shortcut to the window D) 320 included in the screen 210. When the operation obtaining unit 410 obtains an operation in which the drag state is released in a state in which the operating point is overlapped with the icon D, the operation obtaining unit 410 stores the card 300 in the window D.

FIG. 10 is a diagram illustrating an example of processing when the card is at the edge of a screen. A case 5 is an example is which the card 300 is at the end of the screen, and there is no space to which the operating point is dragged. In such a case, the drag operation of the operating point becomes outside the screen, and situations occur such as a case in which there is no space in which an icon is displayed, and a case in which there is no operation space. It is assumed that an operating point mark used to perform a drag operation is displayed on the card, and the drag operation or the like may be performed by matching of the operating point with a location of the mark.

When the card 300 is at the edge of the screen as illustrated in the case 5, a measure is taken by a processing method illustrated in the case 6. In the case 6, a starting point is at the edge of the screen, and there is no space in which the drag operation is performed. When the operation obtaining unit 410 detects that there is no operation space, the operation obtaining unit 410 moves a starting point 310a to a starting point 310a'. As described above, a space in which a drag operation is performed may be obtained by moving the starting point 310a.

FIG. 11 is a diagram illustrating an example of a drag direction. In FIGS. 2 to 10, the operation in which the card 300 is slid by a drag operation is described as an example. The direction of the drag operation is opposed to a direction in which a window exists when viewed from the starting point.

In the example of FIG. 11, the direction of the drag operation is the same as the direction toward the window from the starting point. Icons corresponding to the windows are displayed in the same direction as the drag direction from the starting point. When there is a sufficient space for an operation to move from the starting point to the operating point and the like, the drag direction may be the same as a direction toward the window from the starting point.

Figure 12:
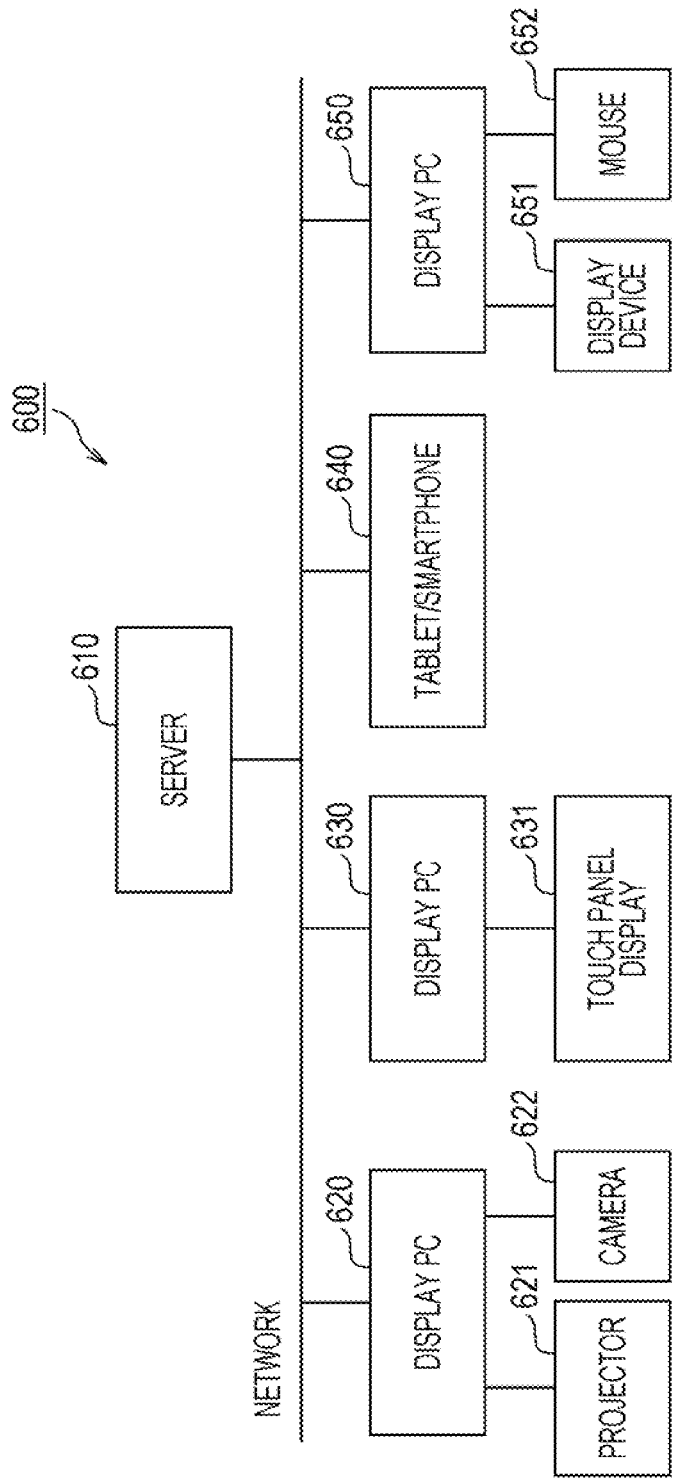
FIG. 12 is a diagram illustrating an example of a network configuration of the information processing device according to the first and the second embodiments.

FIG. 12 is a diagram illustrating an example of a network configuration of the information processing device according to the first and the second embodiments. An information processing system 600 illustrated in FIG. 12 includes a server 610, display personal computers (PCs) 620, 630, and 650, and a tablet/smartphone 640, and these units are coupled to each other through a network. The server 610 operates as the information processing device 400 according to the first embodiment or the information processing device 500 according to the second embodiment, and manages display and operations of the display PCs 620, 630, and 650 and the tablet/smartphone 640 that are coupled to each other.

The display PC 620 includes a projector 621 and a camera 622. The display PC 620 operates as the screens 210, 220, and 230 when the projector 621 projects images on the screens. The camera 622 recognizes a dedicated electronic pen or the like and is used to obtain an operation of the user.

The display PC 630 includes a touch panel display 631. The touch panel display 631 displays an image and operates as one of the screens 210, 220, and 230, and the like. In addition, the touch panel display 631 may obtain an operation of the user.

The tablet/smartphone 640 displays an image on a display provided in the tablet/smartphone 640, and operates as one of the screens 210, 220, and 230, and the like. The tablet/smartphone 640 may obtain an operation of the user from the display provided in the tablet/smartphone 640.

The display PC 650 includes a display device 651 and a mouse 652. The display device 651 is realized by a liquid crystal monitor or a projector, and operates as one of the screens 210, 220, and 230, and the like. The mouse 652 is an input device to which an operation of the user is input.

Figure 13:
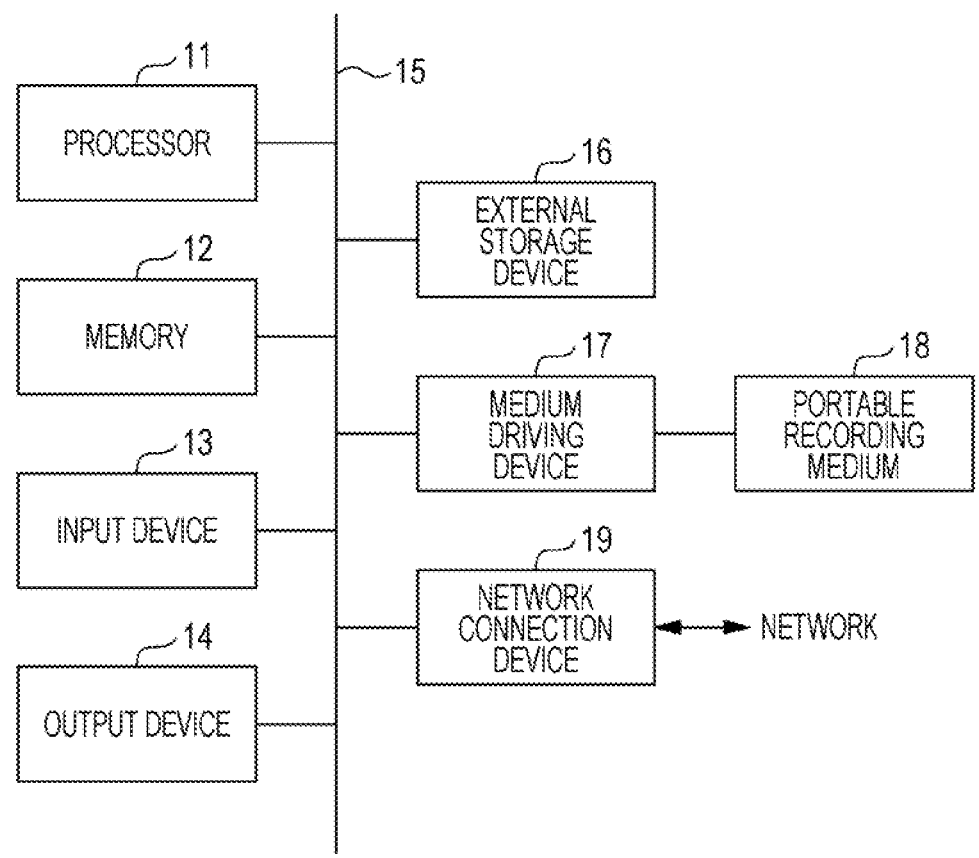
FIG. 13 is a diagram illustrating an example a hardware configuration of the information processing device according to the first and the second embodiments.

FIG. 13 is a diagram illustrating an example a hardware configuration of the information processing device according to the first and the second embodiments. Each of the information processing devices 400 and 500 includes a processor 11, a memory 12, a bus 15, an external storage device 16, and a network connection device 19. In addition, optionally, each of the information processing devices 400 and 500 may include an input device 13, an output device 14, and a medium driving device 17. Each of the information processing devices 400 and 500 may be realized, for example, by a computer or the like.

The processor 11 may be set to be a certain processing path including a central processing unit (CPU). In the information processing device 400, the processor 11 operates as the operation obtaining unit 410, the direction calculation unit 420, the distance calculation unit 430, the window identification unit 440, the display management unit 450, and the UI display unit 460. In the information processing device 500, the processor 11 operates as the operation obtaining unit 410, the direction calculation unit 420, the distance calculation unit 430, the window identification unit 440, the display management unit 450, the UI display unit 460, the location calculation unit 510, and the correspondence location calculation unit 520. Here, the UI display unit 460 displays an image on a display PC that is a management target of the information processing device 400. The processor 11 may execute, for example, a program stored in the external storage device 16. The memory 12 stores data that has been obtained by an operation of the processor 11 and data used for processing of the processor 11, as appropriate. The network connection device 19 is used to communicate with another device.

The input device 13 is realized, for example, as buttons, a keyboard, a mouse, or the like, and the output device 14 is realized as a display or the like. The bus 15 couples the processor 11, the memory 12, the input device 13, the output device 14, the external storage device 16, the medium driving device 17, and the network connection device 19 to each other so that pieces of data are transmitted and received between the devices. The external storage device 16 stores a program, data, and the like, and provides the stored information to the processor 11 or the like, as appropriate. The medium driving device 17 may output pieces of data of the memory 12 and the external storage device 16 to a portable recording medium 18, and read a program, data, and the like, from the portable recording medium 18. Here, it may be assumed that the portable recording medium 18 is a certain portable recording medium including a floppy disk, a magneto-optical (MO) disk, a compact disk recordable (CD-R), and a digital versatile disk recordable (DVD-R).

Figure 14:
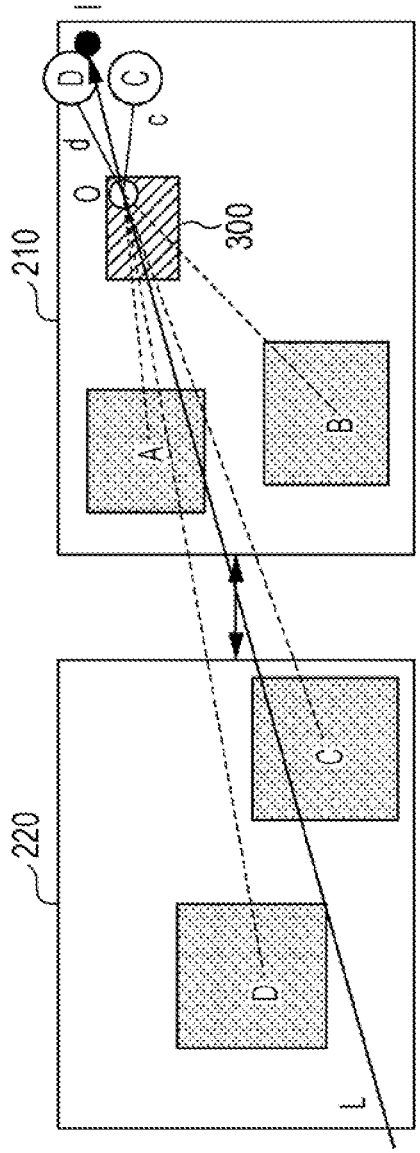
FIG. 14 is a diagram illustrating an example of a method in which locations are calculated at which icons are respectively arranged.

FIG. 14 is a diagram illustrating an example of a method in which locations are calculated at which icons are respectively arranged. In FIG. 14, in the screen 210, the windows A and B, and the card 300 are arranged. In the screen 220, the windows D and C are arranged. It is assumed that the left edge of the screen 210 and the right edge of the screen 220 are coupled to each other. FIG. 14 illustrates an example in which an operation is performed in which the card 300 is dragged from a starting point O to an operating point I in a system in which the screens 210 and 220 are allowed to be used as a single screen.

First, a straight line that has been obtained by extending the line of the drag operation from the starting point O to the operating point I is set as a straight line L. In FIG. 14, it is assumed that locations are calculated at which the icons respectively corresponding to the windows C and D are arranged. When an angle θ made by a straight line CO from the center point of the window C to the starting point O and a straight line DO from the center point of the window D to the starting point O is less than a specific threshold value, the direction calculation unit 420 calculates locations at which the icons are arranged so that the following equations 1 and 2 are satisfied, respectively. A constant k used for the equations 1 and 2 is set in advance.

$$\angle cOI = k \times \angle COL \quad (1)$$

$$\angle dOI = k \times \angle DOL \quad (2)$$

Here, for example, "∠COL" indicates an angle between the straight line L and the straight line CO that couples the center point of the window C and the starting point O, and this is also applied to the other angles as well.

As described above, when the direction calculation unit 420 calculates locations at which the icons are respectively arranged so that the equations 1 and 2 are satisfied, the icons C and D do not overlap with each other and are displayed around the operating point.

Figure 15:
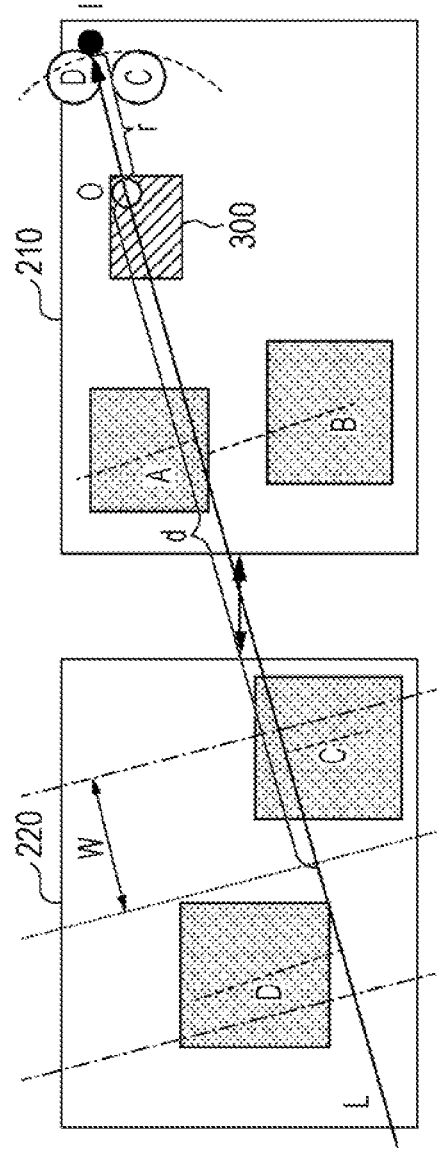
FIG. 15 is a diagram illustrating an example of processing for determination of an icon to be displayed.

FIG. 15 is a diagram illustrating an example of processing for determination of an icon to be displayed. In FIG. 15, in the screen 210, the windows A and B, and the card 300 are arranged. In the screen 220, the windows D and C are arranged. It is assumed that the left edge of the screen 210 and the right edge of the screen 220 are coupled to each other. FIG. 15 illustrates an example in which an operation is performed in which the card 300 is dragged from the starting point O to the operating point I in a system in which the screens 210 and 220 are allowed to be used as a single screen. A straight line that has been obtained by extending the line of the drag operation from the starting point O to the operating point I is set as a straight line L. A distance of the straight line L from the starting point O to the operating point I is set as a distance r. It is assumed that a constant $\alpha$ and a constant $\beta$ are set to the distance calculation unit 430 in advance.

First, the distance calculation unit 430 calculates a distance d from the starting point to the center point of determination areas by multiplying the distance r of the drag operation from the starting point O to the operating point I by the constant $\alpha$. After that, the distance calculation unit 430 calculates a determination area w by multiplying the distance d from the starting point to the center point of the determination area by the constant $\beta$. Then, the window identification unit 440 determines that windows included between dotted chain lines indicating the determination area ±w centered around a line apart from the starting point O by the distance d are the windows C and D. The window identification unit 440 determines that the windows included between the dotted chain lines are the windows C and D depending on whether the feet of the perpendiculars from the centers of the windows are included between the dotted chain lines indicating the determination area ±w.

As described above, the window identification unit 440 may determine windows included in the determination areas, based on the result of the distance calculation unit 430.

Figure 16:
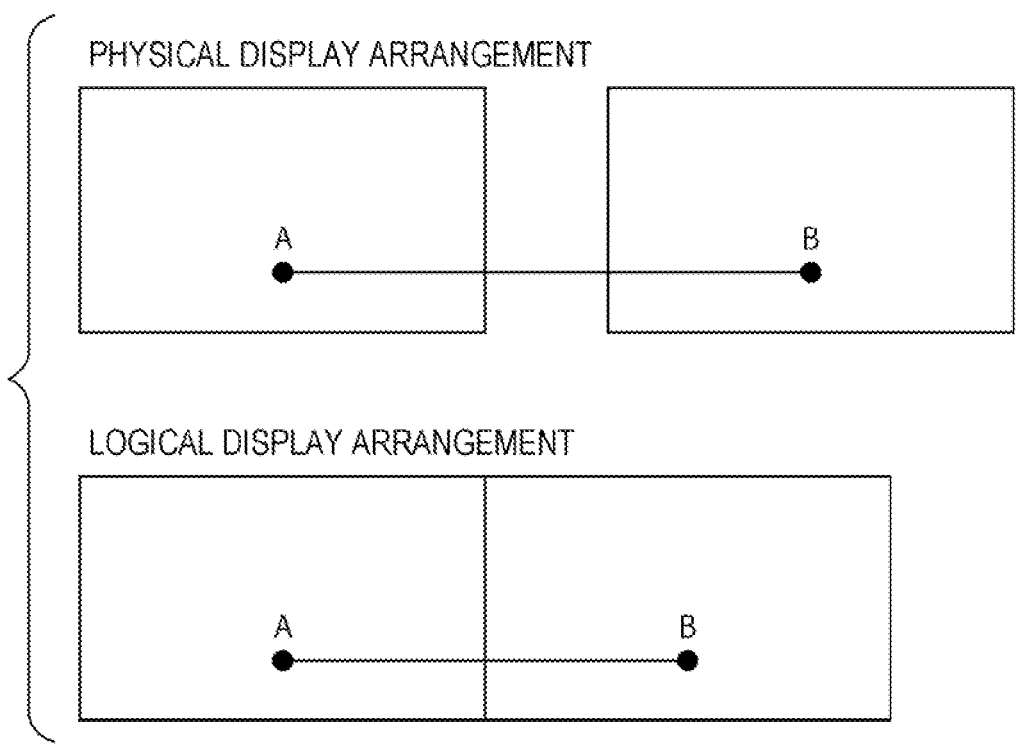
FIG. 16 is a diagram illustrating an example of a logical distance and a physical distance of displays.

FIG. 16 is a diagram illustrating an example of a logical distance and a physical distance of displays. In an example of physical display arrangement, two displays are arranged. It is assumed that the two displays are provided so as to be physically separated from each other. In this case, a distance between the points A and B includes the physical distance between the displays.

In addition, in an example of logical display arrangement, two displays are coupled to each other without a space. Therefore, there is no a distance between the displays.

The display management unit 450 converts the direction and the distance that have been calculated in a logical coordinate system into values based on a physical coordinate system. The display management unit 450 manages locations and the like at which the displays are respectively arranged and may identify a display that is a movement destination of an object, based on the physical coordinate system.

Figure 17:
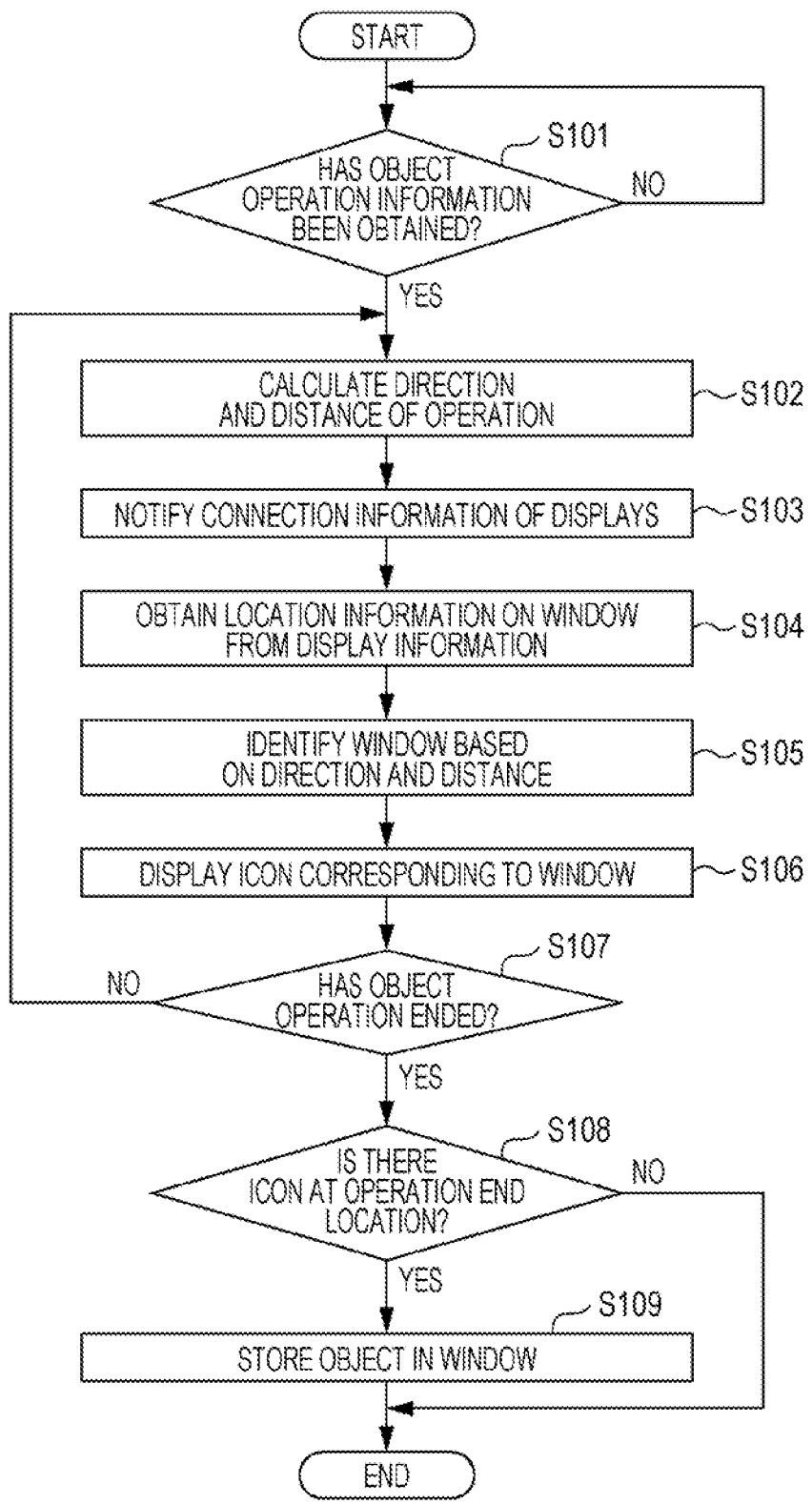
FIG. 17 is a flowchart illustrating an example of processing of the information processing device according to the first embodiment.

FIG. 17 is a flowchart illustrating an example of the processing of the information processing device according to the first embodiment. The operation obtaining unit 410 determines whether operation information on start of a movement operation of an object (card 300) has been obtained (Step S101). When operation information is not obtained (NO in Step S101), the operation obtaining unit 410 repeats the processing of Step S101. When operation information has been obtained (YES in Step S101), the direction calculation unit 420 and the distance calculation unit 430 respectively calculate a direction and a distance from a trajectory of a drag operation in the movement operation (trajectory from the starting point to the operating point) (Step S102). The display management unit 450 notifies the window identification unit 440 of information indicating a connection relationship of displays (Step S103). The window identification unit 440 obtains pieces of location information on windows from the information indicating the connection relationship of the displays (Step S104). The window identification unit 440 identifies windows included in determination areas corresponding to the calculated direction and distance (Step S105). The UI display unit 460 displays icons corresponding to the identified windows (Step S106).

The operation obtaining unit 410 determines whether the movement operation has ended (Step S107). When the movement operation is yet to end (NO in Step S107), the information processing device 400 repeats the processing from Step S102. When the movement operation has ended (YES in Step S107), the window identification unit 440 determines whether there is an icon at the operation end location (Step S108). When there is an icon at the operation end location (YES in Step S108), the window identification unit 440 stores the object in a window corresponding to the icon (Step S109). When there is no icon at the operation end location (NO in Step S108), or when Step S109 ends, the information processing device 400 ends the processing of the movement of the object.

Figure 18A:
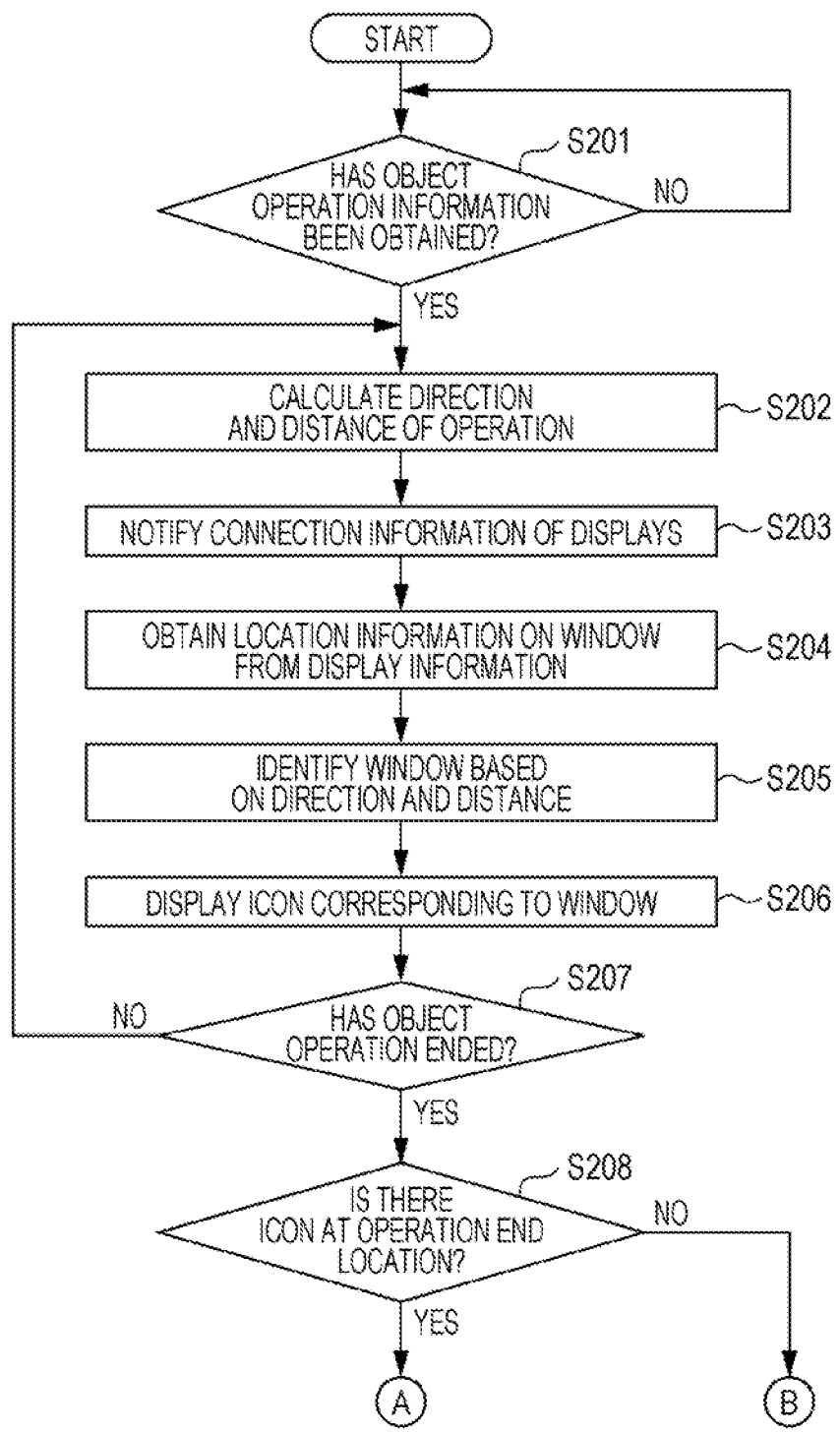
FIG. 18A is a flowchart illustrating an example of processing of the information processing device according to the second embodiment.
Figure 18B:
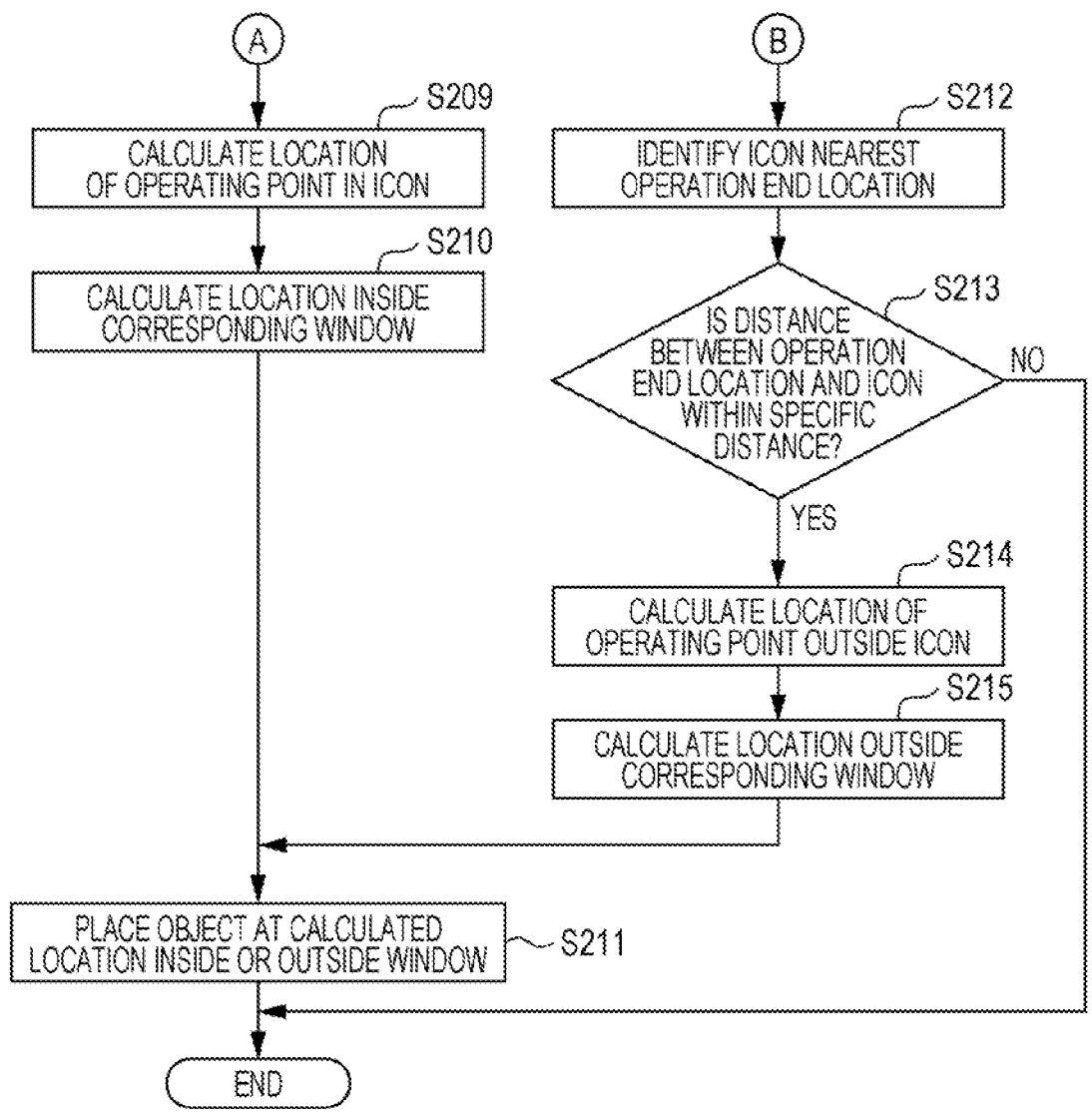
FIG. 18B is a flowchart illustrating the example of the processing of the information processing device according to the second embodiment.

FIGS. 18A and 18B are a flowchart illustrating an example of the processing of the information processing device according to the second embodiment. The operation obtaining unit 410 determines whether operation information on start of a movement operation of an object (card 300) has been obtained (Step S201). When operation information is not obtained (NO in Step S201), the operation obtaining unit 410 repeats the processing of Step S201. When operation information has been obtained (YES in Step S201), the direction calculation unit 420 and the distance calculation unit 430 respectively calculate a direction and a distance of a trajectory of a drag operation in the movement operation (trajectory from the starting point to the operating point) (Step S202). The display management unit 450 notifies the window identification unit 440 of information indicating a connection relationship of displays (Step S203). The window identification unit 440 obtains pieces of location information on windows from the information indicating the connection relationship of the displays (Step S204). The window identification unit 440 identifies windows included in the determination areas corresponding to the calculated direction and distance (Step S205). The UI display unit 460 displays icons corresponding to the identified windows (Step S206).

The operation obtaining unit 410 determines whether the movement operation has ended (Step S207). When the movement operation is yet to end (NO in Step S207), the information processing device 500 repeats the processing from Step S202. When the movement operation has ended (YES in Step S207), the window identification unit 440 determines whether there is an icon at the operation end location (Step S208).

When there is an icon at the operation end location (YES in Step S208), the location calculation unit 510 calculates the operation end location in the icon (Step S209). The correspondence location calculation unit 520 calculates a location in a window, which corresponds to the operation end location in the icon (Step S210). The window identification unit 440 stores the object in the location in the window, which has been calculated (Step S211).

When there is no icon at the operation end location (NO in Step S208), the location calculation unit 510 calculates an operation end location and identifies an icon nearest the operation end location (Step S212). The location calculation unit 510 determines whether a distance between the operation end location and the icon that is the nearest the operation end location is within a specific distance (Step S213). When the distance between the operation end location and the icon that is the nearest the operation end location is within the specific distance (YES in Step S213), the location calculation unit 510 calculates an operation end location outside the icon (Step S214). The correspondence location calculation unit 520 calculates a location outside a window, which corresponds to the operation end location outside the icon (Step S215). When the processing of Step S215 ends, the information processing device 500 executes the processing of Step S211 and stores (displays) the object in the calculated location outside the window.

When the processing of Step S211 ends or when the icon that is the nearest the operation end location is separated from the operation end location by more than the specific distance (NO in Step S213), the information processing device 500 ends the processing of the movement of the object.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A user interface method, performed by a computer, comprising:
    identifying a window that exists in an area determined in accordance with a relative distance between a starting point and a current operating point of an input operation by a user to move an object, and a direction from the starting point to the current operating point, in an operation to select a window as a movement destination of the object, from among a plurality of windows each displayed on one of a plurality of displays, respectively; and
    displaying a movement destination candidate icon indicating the identified window, wherein
    in the identifying, the current operating point is moved in a direction opposite to a direction from the starting point to a movement destination, and
    in the displaying, the movement destination candidate icon is displayed in the vicinity of the current operating point.

2. The user interface method according to claim 1, further comprising;
    storing the object, when the current operating point is on the movement destination candidate icon, and an end operation is performed in which the movement of the current operating point ends, in the window corresponding to the movement destination candidate icon.

3. The user interface method according to claim 2, wherein
    in the identifying, when the end operation is performed, a location of the current operating point in or around the movement destination candidate icon is calculated, and a location in or around the identified window, which corresponds to the calculated location of the current operating point, is identified, and
    in the storing, the object is placed in the identified location.

4. The user interface method according to claim 1, wherein
    in the identifying, a display is identified that exists in an area determined in accordance with the relative distance between the starting point and the current operating point of the input operation to move the object and the direction from the starting point to the current operating point, and
    in the displaying, a display number used to identify the identified display is displayed so as to be allowed to be selected.

5. An information processing system comprising:
    a plurality of displays,
    a memory, and
    a processor, coupled to the memory and the plurality of displays, configured to execute a process, the process comprising;
        identifying a window that exists in an area determined in accordance with a relative distance between a starting point and a current operating point of an input operation by a user to move an object, and a direction from the starting point to the current operating point, in an operation to select a window as a movement destination of the object, from among a plurality of windows each displayed on one of a plurality of displays, respectively; and
        displaying a movement destination candidate icon indicating the identified window, wherein
        in the identifying, the current operating point is moved in a direction opposite to a direction from the starting point to a movement destination, and
        in the displaying, the movement destination candidate icon is displayed in the vicinity of the current operating point.

6. The information processing system according to claim 5, wherein the process further comprises;
    storing the object, when the current operating point is on the movement destination candidate icon, and an end operation is performed in which the movement of the current operating point ends, in the window corresponding to the movement destination candidate icon.

7. The information processing apparatus according to claim 6, wherein
    in the identifying, when the end operation is performed, a location of the current operating point in or around the movement destination candidate icon is calculated, and a location in or around the identified window, which corresponds to the calculated location of the current operating point, is identified, and
    in the storing, the object is placed in the identified location.

8. The information processing system according to claim 5, wherein
    in the identifying, a display is identified that exists in an area determined in accordance with the relative distance between the starting point and the current operating point of the input operation to move the object and the direction from the starting point to the current operating point, and
    in the displaying, a display number used to identify the identified display is displayed so as to be allowed to be selected.

9. A computer-readable non-transitory medium storing a user interface program which causes a computer to perform a process comprising:
    identifying a window that exists in an area determined in accordance with a relative distance between a starting point and a current operating point of an input operation by a user to move an object, and a direction from the starting point to the current operating point, in an operation to select a window as a movement destination of the object, from among a plurality of windows each displayed on one of a plurality of displays, respectively; and displaying a movement destination candidate icon indicating the identified window, wherein in the identifying, the current operating point is moved in a direction opposite to a direction from the starting point to a movement destination, and in the displaying, the movement destination candidate icon is displayed in the vicinity of the current operating point.

* * * * *